United States Patent
Kazi et al.

(10) Patent No.: US 11,314,442 B2
(45) Date of Patent: Apr. 26, 2022

(54) MAINTAINING NAMESPACE HEALTH WITHIN A DISPERSED STORAGE NETWORK

(71) Applicant: International Business Machines Corporation, Armonk, NY (US)

(72) Inventors: Asimuddin Kazi, Naperville, IL (US); Ethan Wozniak, Cook, IL (US)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 16/702,789

(22) Filed: Dec. 4, 2019

(65) Prior Publication Data
US 2021/0173582 A1    Jun. 10, 2021

(51) Int. Cl.
*G06F 3/06*    (2006.01)

(52) U.S. Cl.
CPC ............ *G06F 3/0653* (2013.01); *G06F 3/067* (2013.01); *G06F 3/0614* (2013.01); *G06F 3/0647* (2013.01); *G06F 3/0683* (2013.01)

(58) Field of Classification Search
USPC .......................................................... 711/154
See application file for complete search history.

(56) References Cited

U.S. PATENT DOCUMENTS

| | | | |
|---|---|---|---|
| 2005/0060618 A1 | 3/2005 | Guha | |
| 2014/0006465 A1* | 1/2014 | Davis | G06F 16/183 707/827 |
| 2015/0046756 A1 | 2/2015 | Sreekumaran | |
| 2015/0066536 A1* | 3/2015 | Spates | G16H 10/60 705/3 |
| 2015/0331621 A1* | 11/2015 | Slik | G06F 3/0665 711/114 |
| 2017/0116130 A1* | 4/2017 | Sundaravaradan | G06F 16/2453 |
| 2019/0163379 A1 | 5/2019 | Bottan | |
| 2019/0205228 A1* | 7/2019 | Wilson | G06F 11/3006 |

OTHER PUBLICATIONS

Ma et al., "RAIDShield: Characterizing, Monitoring, and Proactively Protecting Against Disk Failures", This paper is included in the Proceedings of the 13th USENIX Conference on File and Storage Technologies (FAST '15). Feb. 16-19, 2015 • Santa Clara, CA, USA, ISBN 978-1-931971-201, 17 pps., <https://www.usenix.org/system/files/conference/fast15/fast15-paper-ma.pdf>.

* cited by examiner

*Primary Examiner* — Charles Rones
*Assistant Examiner* — Jonah C Krieger
(74) *Attorney, Agent, or Firm* — Sonny Z. Zhan (57) ABSTRACT

A method for determining to rebuild a namespace. The method includes one or more computer processors identifying a set of storage devices associated with the namespace of the user. The method further includes determining a state of health of a namespace based on information related to the set of storage devices associated with the namespace and further includes identifying a set of criteria related to the state of health of the namespace. The method further includes responding to determining that one or more criteria related to the state of health of namespace attains respective trigger values by replacing a first set of storage devices that store data corresponding to the namespace and are included among one or more storage systems. The method further includes dictating to replace the first set of storage devices that store data corresponding to the namespace and are included among the one or more storage systems.

14 Claims, 6 Drawing Sheets

MAINTAINING NAMESPACE HEALTH WITHIN A DISPERSED STORAGE NETWORK

BACKGROUND OF THE INVENTION

The present invention relates generally to the field of storage devices, and more particularly to replacing storage devices to maintain the health of namespaces within a dispersed storage network.

Cloud computing is an information technology paradigm that enables ubiquitous access to shared pools of configurable computing resources over the Internet, such as computational resources, storage resource, and software applications and services. Cloud computing utilizes distributed computing resources to increase computational performance, improve reliability/availability of computing resources, reduce response times, and utilize various techniques to ensure the integrity and security of data stored on the cloud. For example, cloud computing providers can provide individuals, providers of Internet-based services, and companies high-capacity cloud-storage solutions via an infrastructure as a service (IaaS) model.

The physical storage of data within the cloud can span multiple servers at differing locations, which are typically owned and managed by a service provider (i.e., a hosting company). Some cloud storage solutions can utilize various techniques and algorithms to secure data and can further utilize object storage to store and organize the data. The data can be distributed into unrecognizable slices that are dispersed to different storage locations, which also improves the security of the stored data. In addition, cloud storage (e.g., dispersed storage) can utilize erasure coding and the duplication of data slices to ensure the integrity of the data stored in the cloud and allow reconstruction of the data without requiring that all the slices of data are available, such as when less than a threshold number of storage locations are not accessible or when a storage device is off-line or damaged.

Cloud storage solutions allow a service provider to store data among a plurality of storage systems and storage nodes that include a plurality of differing storage media. The differing storage media can be further comprised of storage devices of differing quality, capacities, capabilities, and related ages (e.g., health), such as commodity solid-state drives and high-performance hard disk drives.

SUMMARY

According to an aspect of the present invention, there is a method, computer program product, and/or system for determining to rebuild a namespace. In an embodiment, the method includes at least one computer processor identifying a set of storage devices associated with the namespace of the user. The method further includes at least one computer processor determining a state of health of a namespace based on information related to the set of storage devices associated with the namespace. The method further includes at least one computer processor identifying a set of criteria related to the state of health of the namespace. The method further includes at least one computer processor responding to determining that one or more criteria related to the state of health of namespace attains respective trigger values, by replacing a first set of storage devices that store data corresponding to the namespace and are included among one or more storage systems. The method further includes at least one computer processor dictating to replace the first set of storage devices that store data corresponding to the namespace and are included among the one or more storage systems.

DETAILED DESCRIPTION

Embodiments of the present invention recognize that network-accessible, distributed storage is a computing capability that is typically offered by cloud computing providers. In particular, a user of cloud computing services may store and retrieve data on cloud infrastructure, such as a dispersed storage network (DSN) maintained by a cloud computing provider. Cloud storage enables a user or a business, via one or more computers or computing systems, to store files, applications, etc., on an Internet-based storage system.

Embodiments of the present invention recognize that object storage is one of the storage architectures utilized by cloud storage providers. Object storage is a computer data storage architecture that manages data as objects. Each object typically includes the data itself, a variable amount of metadata, and a globally unique identifier. Object storage can be implemented at multiple levels, such as the device level (object-storage device), the system level, and/or the interface level. In each scenario, object storage seeks to enable capabilities, such as interfaces that can be directly programmable by the application, a namespace that can span multiple instances of physical hardware, and data-management functions like data replication and data distribution at object-level granularity.

Embodiments of the present invention recognize that an Internet-based storage system may include redundant array of independent disks (RAID) systems and/or dispersed storage systems that use an error correction schemes, erasure coding, and/or information dispersal algorithms (IDAs) to break files into unrecognizable segments (e.g., slices) that are distributed and stores data within the Cloud (e.g., a redundant array of independent nodes or other storage systems). Embodiments of the present invention further recognize that RAID technology is inadequate for protecting digital information from data loss at petabyte-scale and beyond. Traditional storage architectures are not designed to scale to the petabyte range. For example, some challenges of petabyte-scale storage within tradition architectures include data integrity suffers when system size is 10 billion times larger than the bit error rate of a hard disk drive, and data availability suffers when hundreds of drives fail every day and require a week to rebuild.

Embodiments of the present invention also recognize that various storage device manufacturers and information technology (IT) organizations have developed databases and other tracking/monitoring methodologies to determine when the failure of a storage device is probable or imminent. Embodiments of the present invention recognize that based on when a storage system (e.g., storage node) was installed, a set of storage devices within the storage system that can be the same age or similar ages, capabilities, and/or characteristics. If the usages among the set of storage devices are similar, such as power-on time for hard dish drives (HDDs) or cumulative write activity for solid-state drives (SSDs), then the set of storage devices of a storage system have a higher probability of failing within a given period of time. Therefore, all of one type of storage device within a storage system can be proactively replaced based on time.

However, embodiments of the present invention further recognize that other aspects of cloud computing include on-demand access and elastic provisioning of resources. Therefore, some storage systems are not uniformly utilized, and that the age of a storage device within a given storage system may not be the single factor that prompts the replacement of a set of storage devices. In addition, since resources within a cloud storage system are shared by a plurality of users and applications, the utilization among storage devices can be variable. As referred to herein, a user may be representative of an individual; another computing system or application; or another entity, such as a business, a university, an enterprise, an organization, etc.

Embodiments of the present invention can determine or estimate a state of health for one or more storage systems and associated namespaces based on information corresponding to the installed storage devices. The state of health of a storage system may be described with respect to a predicted time to failure, a probability of failure with respect to time, an operational duration prior to a set of storage devices exhibiting effects of degradation, etc., which in turn affects the state of health of associated with a namespace. For example, embodiments of the present invention can utilize power-on time for hard dish drives (HDDs) or cumulative write activity for solid-state drives (SSDs) as respective measures of device health, which affects the state of health of the storage system that include the storage devices. Various aspects of the present intention are applicable to differing storage device types, such as HDDs, SSDs, storage-class memory, etc.

In one embodiment, cloud storage is a model of computer data storage in which the data is stored in logical pools, such as namespaces. In some scenarios, a namespace is a storage management solution that enables the centralized management of distributed resources. From the perspective of a user, the folders and files a of namespace appear to reside on a single, high-capacity hard disk. The namespace includes an address structure that uniquely identifies and locates objects, data slices, vaults, and servers within a cloud storage and/or a dispersed storage environment. In some embodiments, a namespace can pool multiple file systems into a single, global file system. In various embodiments, a namespace pools storage from multiple, heterogeneous storage device types, such as HDDs, SSDs, magnetic tape, flash memory, storage-class memory, etc.; and across differing storage platforms and/or operating systems.

In a different embodiment, a namespace (e.g., a global namespace) represents a set of possible internal names related to a storage system. A global namespace may further include a plurality of sub-namespaces (e.g., logical buckets, user namespaces, etc.). With respect to each internal name and/or sub-namespaces, data is erasure coded across a number of disks corresponding to one or more storage devices within a portion of the namespace. In another embodiment, erasure coded data of a sub-namespace is stored among storage devices of different storage nodes (e.g., within one storage device of a storage node).

The descriptions of the various scenarios, instances, and examples related to the present invention have been presented for purposes of illustration but are not intended to be exhaustive or limited to the embodiments disclosed.

Figure 1:
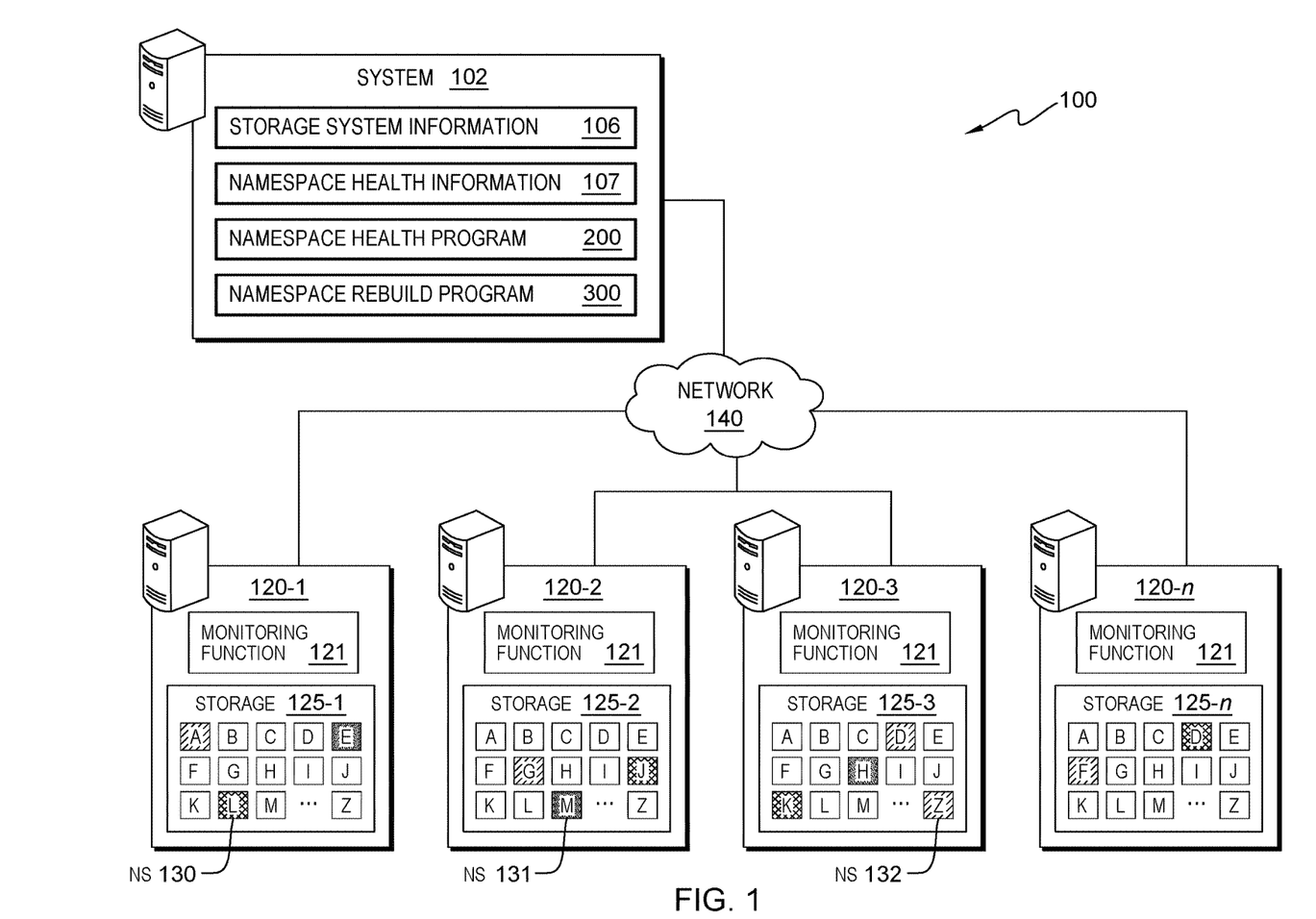
FIG. 1 illustrates a networked-computing environment, in accordance with an embodiment of the present invention.

The present invention will now be described in detail with reference to the Figures. FIG. 1 is a functional block diagram illustrating a portion of a cloud computing environment, generally designated dispersed storage environment 100, in accordance with one embodiment of the present invention, such as cloud computing node 10 (discussed in further detail with respect to FIG. 5). In an embodiment, dispersed storage environment 100 includes: system 102 and a plurality storage systems represented by storage system 120-1 through storage system 120-n, and all interconnected over network 140. In some embodiments storage system 120-1 through storage system 120-n can also represent differing physical cloud-storage locations. In addition, FIG. 1 also depicts three namespaces, NS 130 (cross-hatch shading), NS 131 (speckled shading), and NS 132 (diagonal-hatch shading) that are distributed or striped among instances of storage system 120.

In some embodiments, dispersed storage environment 100 also includes service elements, administrative consoles, etc. (not shown), respectively associated with each physical location that includes one or more instances of storage system 120. For example, an administrative console may be utilized to monitor and track information corresponding to instances of storage system 120, such as active resources, status information (e.g., storage system operations), etc. An administrative console within dispersed storage environment 100 can receive information and dictates from system 102, such as actions and dictates determined by namespace rebuild program 300.

In various embodiments, a plurality of other computing systems and users (not shown) utilize network 140 to access dispersed storage environment 100 and to store data. In addition, aspects of dispersed storage environment 100 can also obtain data and utilize software of Internet-accessible resources, such as websites of storage device manufacturers, storage system manufactures, and IT organizations. In other embodiments, FIG. 1 is a functional block diagram illustrating a portion of a distributed storage environment or a storage architecture different from a cloud computing environment.

FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

System 102 and storage system 120-1 through storage system 120-n may be laptop computers, tablet computers, netbook computers, personal computers (PC), desktop computers, or any programmable computer systems known in the art. In certain embodiments, system 102 and storage system 120-1 through storage system 120-n represent computer systems utilizing clustered computers and components (e.g., database server computers, application server computers, etc.) that act as a single pool of seamless resources when accessed through network 140, as is common in data centers and with cloud-computing applications. System 102 and storage system 120-1 through storage system 120-n may include components, as depicted and described in further detail with respect to FIG. 4, in accordance with embodiments of the present invention. In general, system 102 and storage system 120-1 through storage system 120-*n* are representative of any programmable electronic device or combination of programmable electronic devices capable of executing machine-readable program instructions and communicating via network 140.

System 102 includes: storage system information 106, namespace health information 107, namespace health program 200, and namespace rebuild program 300. System 102 also includes various programs, such as a website interface; one or more web daemons; a file system mapping and management program; a network mapping program; network communication programs; various functions and/or algorithms to perform various statistical, analytical, and predictive determinations (not shown). For example, system 102 includes a drive failure prediction function (not shown) that predicts a failure date and/or a probability of failure with respect to time of a storage device. The drive failure prediction function uses information and metrics corresponding to each storage device, obtained by an instances of monitoring functions 121, and/or a monitoring/diagnostic technology embedded within a storage device.

In an embodiment, system 102 is representative of one or more computing systems within a cloud computing system. In some embodiments, system 102 utilizes network 140 to poll or query storage system 120-1 through storage system 120-*n* and obtain information related to an instance of storage system 120. System 102 may obtain information related to a storage system by initiating the execution of an included instance of monitoring functions 121. Alternatively, system 102 receives information related to a storage system based on the periodic execution of an instance of monitoring functions 121 within a storage system. System 102 may store the information within storage information 106 for subsequent access by namespace health program 200 and/or namespace rebuild program 300.

In other embodiments, system 102 utilizes network 140 to access other computing systems (not shown) external to dispersed storage environment 100 that include resources related to the failure of storage devices. A network-accessible resource that includes information related to failures of storage devices may include a manufacture's website, one or more IT organizations that aggregate storage device information, and/or publications associated with analyses of failures of storage devices. Other resources may include algorithms and/or analytics related to predicting the failure of storage devices.

Storage system information 106 includes aggregated information related to plurality of storage systems within dispersed storage environment 100. In an embodiment, information related to a storage system may include the availability data, a physical (e.g., geographic) location, configuration information related to the storage system, etc. Configuration information related to a storage system may include an identifier, a network address, a global namespace, one or more internal namespaces, one or more sub-namespaces, respective capabilities of storage 125-1 through 125-*n*, capabilities of other included hardware, installed/supported firmware and/or software, a file structure, etc.

In some embodiments, storage information 106 further includes information corresponding to each storage device of the plurality of storage devices within a storage system, such as information corresponding to device A through device Z of storage 125-1 of storage system 120-1. Information corresponding to a storage device may include a manufacturer, a capacity, a date of manufacture, a lot number, a hardware architecture, software-assigned IDs associated with the storage device, etc. Some information corresponding to a storage device can be determined, such as a power-on time, an operational age, a frequency of write operations, and a health of storage device. The health of a storage device may be described with respect to a predicted time for a storage device to fail, a probability of failure for a storage device, an operational duration prior to a storage device exhibiting effects of degradation, etc.

In various embodiments, information corresponding to a storage device within storage information 106 is determined by a self-monitoring, analysis, and reporting technology (SMART) system embedded within the storage device. The SMART system of a storage device detects and reports, to one or more external programs and/or computing systems, various metrics (e.g., indicators) related to storage device operations and reliability. Reported information may include environment and operational values, error rates and respective error types, etc.

Namespace health information 107 includes current and previously determined states of health related to a user namespace and/or a namespace related to a storage system, such as information determined by namespace health program 200. Namespace health information 107 includes the states of health respectively associated with a plurality of namespaces within dispersed storage environment 100, such as NS 130, NS 131, and NS 132. In an embodiment, namespace health information 107 also includes other information that affects determining the state of health of a namespace, such as service level agreements (SLAs) respectively associated with users storing data within dispersed storage environment 100, data storage parameters (e.g., erasure coding ratios), compliance dictates, etc.

In various embodiments, namespace health information 107 also includes historic information related to previous rebuilds (e.g., maintenance) of storage systems and/or namespaces, such as durations associated with obtaining one or more groups of storage devices; durations associated with replacing a give number of drives within a storage system; rates (e.g., MB/minute) related to migrating-out or transferring data, data slices, data objects, extents, or other elements associated with a data structure; rates of migrating-back or restoring data to a replaced set of storage devices. Rates of migrating and/or restoring data may be further related to data movement within a storage system or networked transfers of data to and from different storage systems, such as between storage system 120-2 and storage system 120-3.

Namespace health program 200 is a program that determines the health of a namespace. In one embodiment, namespace health program 200 determines the health of a namespace associated with a user with respect to a plurality of storage systems and respective storage devices that comprise the namespace associated with the user within dispersed storage environment 100. In another embodiment, namespace health program 200 determines health of a namespace that corresponds to a storage system. In some embodiments, namespace health program 200 determines the namespace health of a plurality of namespaces within dispersed storage environment 100. Information (e.g., namespace health and one or more affected users) determined by namespace health program 200 is utilized by namespace rebuild program 300 to determine and prioritize the aspects of one or more namespaces to be rebuilt.

In an embodiment, namespace health program 200 executes on a periodic basis within dispersed storage environment 100. In another embodiment, namespace health program 200 executes in response to an event within dispersed storage environment 100. Events within dispersed storage environment 100 include, but are not limited to, dynamic procurement (i.e., activation) of storage resources that were previously powered-off and inaccessible, maintenance activity, out-of-spec environmental condition at a storage system site, creation of new user namespaces, loss of connectivity to one or more storage systems, etc.

Namespace rebuild program 300 is a program for determining whether a portion of a namespace is rebuilt based, at least in part, on information related to the health of the namespace as determined by namespace health program 200. Rebuilding a namespace includes at least replacing one set of storage devices within one or more of storage system 120-1 through storage system 120-n that are predicted to fail based on one or more criteria, such as storage device age. In some scenarios, if data is not replicated, or erasure coded and distributed such that the data can be restored from other storage devices within dispersed storage environment 100 unaffected by the storage device replacement, then namespace rebuild program 300 also includes migrates and restores one or more portions of the stored data to other storage devices unaffected by the namespace rebuild. Namespace rebuild program 300 can migrate data to other storage devices not identified for replacement, another storage system, or a combination thereof. In another scenario, namespace rebuild program 300 can also restrict access (e.g., quarantine) to one or more storage devices identified for replacement or identified as failing to avoid new data from being stored within the access-restricted storage device.

In one embodiment, namespace rebuild program 300 determines to rebuild one or more of storage system 120-1 through storage system 120-n of dispersed storage environment 100 based on metrics related to the namespace of a user. In another embodiment, namespace rebuild program 300 determines to rebuild a storage system of dispersed storage environment 100 based on metrics related to one or more internal names of a namespace corresponding to storage system 120-1 through storage system 120-n. In some embodiments, namespace rebuild program 300 prioritizes the rebuild of one or more storage systems based on various factors, such as information determined by namespace health program 200 that identifies namespaces without replicated data or storage systems that include multiple namespaces (e.g., data associated with a plurality of users).

In a further embodiment, namespace rebuild program 300 generates a storage device replacement plan that includes a list of storage devices and respective storage systems within dispersed storage environment 100, respectively associated predicted failure dates; namespaces and storage systems affected; and information related to data migration durations, rebuild durations, and durations to restore data among the one or more replaced storage devices; etc.

In an embodiment, storage system 120-1 through storage system 120-n are representative of one or more types of storage systems, such as a direct-attached storage, network-attached storage systems or devices, storage area networks, and/or other storage devices. A storage system may refer to: a software-defined storage node; a segment of a storage system, such as drawer, a modular unit, a rack, etc.; a physical storage system; a storage library; a direct-access storage subsystem within a computing system; etc.

In an embodiment, storage system 120-1 through storage system 120-n include monitoring functions 121, one or more respective instances of storage 125-1 through 125-n, and other programs and data (not shown). Examples of other programs and data include virtualization software; dynamic resource procurement (e.g., on-demand resource activation) software; a virtual file system manager; a storage controller session manager; communication programs and protocols; configuration files; and a list of logical unit numbers, volume IDs, uniform resource identifiers (URIs), and/or volsers corresponding to a plurality of included (e.g., installed) storage devices, such as device A through device Z. In some embodiments, storage system 120-1 through storage system 120-n upload information identified and/or determined by aspects of monitoring functions 121 to storage system information 106 of system 102.

In an embodiment, monitoring functions 121 represent a suite of monitoring functions that can identify hardware information and assignments; monitor input/output (I/O) activity (e.g., amounts of data, rates of data, etc.), such as write activity associated with one or more storage devices, generating data heat maps, etc.; a polling facility to communicate with network 140 to determine various attributes, such as bandwidth, communication delays, network traffic; programs to analyze information and extract pertinent data from sensors and/or SMART data/reports; etc. In some embodiments, respective instances monitoring functions 121 monitor, aggregate, and analyze information obtained from storage 125-1 through storage 125-n.

In an embodiment, storage 125-1 through storage 125-n are representative of a plurality of storage devices (e.g., device A through device Z) within respective storage system 102-1 through 120-n. In another embodiment, one or more of storage 125-1 through storage 125-n are representative of a logical storage subsystem or a grouping of storage devices. For example, storage 125-1 may represent a bank or drawer of storage devices within storage system 120-1. The manufacturer, type, and capabilities of storage devices (e.g., device A through storage device Z) within a logical storage subsystem or a grouping of storage devices can be heterogenous as opposed to homogeneous. A storage devices (e.g., device A through device Z) may include one or more non-volatile memory devices that include invariant information related to the storage device, such as manufacturer, model number, manufacture date, product specifications, etc. In various embodiments, the plurally of storage devices within storage system 120-1 through 120-n include SMART systems.

In one embodiment, system 102 communicates through network 140 to the plurality of instances of storage system 120. Network 140 can be, for example, a local area network (LAN), a telecommunications network (e.g., a portion of a cellular network), a wireless local area network (WLAN), such as an intranet, a wide area network (WAN), such as the Internet, or any combination of the previous and can include wired, wireless, or fiber optic connections. In general, network 140 can be any combination of connections and protocols that will support communications between system 102 and one or more instances of storage system 120, in accordance with embodiments of the present invention. In various embodiments, network 140 operates locally via wired, wireless, or optical connections and can be any combination of connections and protocols (e.g., personal area network (PAN), near field communication (NFC), laser, infrared, ultrasonic, etc.).

In various embodiments, network 140 also enables other computing systems and users (not shown) to access at storage systems 120-1 through 120-n. In some embodiments, network 140 also enables system 102 to access other computing systems (not shown) and resources external to dispersed storage environment 100, such as a website of a storage device manufacturer; a website of a storage system manufacturer; one or more IT organizations that aggregate storage device information; and/or algorithms and analytics related to predicting the failure, potential or imminent, of storage devices.

Figure 2:
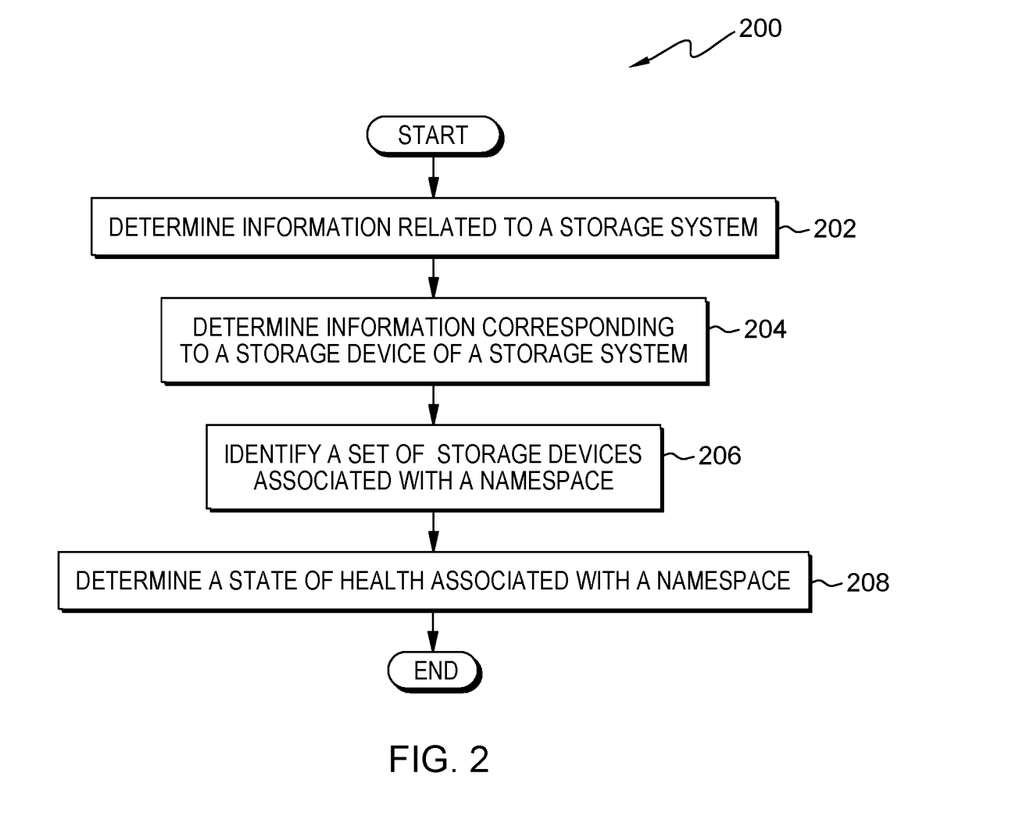
FIG. 2 depicts a flowchart of steps of a namespace health program, in accordance with an embodiment of the present invention.

FIG. 2 is a flowchart depicting operational steps for namespace health program 200, a program for determining the health of one or more namespaces within dispersed storage environment 100, in accordance with embodiments of the present invention. In some embodiments, multiple instances of namespace health program 200 can execute concurrently to determine the health of a plurality of user namespaces and/or namespaces of storage systems.

In step 202, namespace health program 200 determines information related to a storage system. Information related to storage system 120-1 through 120-n include a set of network addresses related to a storage system, one or namespaces associated with the storage system, capabilities and configurations of the storage system, heat maps of data within storage a group of included storage devices (e.g., device A through device Z), etc. Other information related to a storage system of storage system 120-1 through 120-n may include: software included within a storage system; communication interfaces of the storage system; a list of the storage devices included within respective instances of storage 125-1 through storage 125-n, such as a list of logical unit numbers (LUNs), URNs, URIs, volume IDs, volsers, etc., respectively associated with the storage devices. In one example, namespace health program 200 identifies that storage system 120-2 includes one instance of storage 125-2, which further includes device A through device Z. In another example, other information related to storage system 120-1 may indicate that storage 125-1 is a tiered storage array, which further includes a set of SSDs (e.g., devices A through E), a set a of 15K rpm high-performance HDDs (e.g., devices F through J), and a set of high-capacity 5.4K rpm HDDs (e.g., devices K through Z).

In one embodiment, namespace health program 200 determines information related to a storage system based on obtaining information aggregated within storage system information 106. In another embodiment, namespace health program 200 determines information related to a storage system by broadcasting a request for information from the instances of monitoring functions 121 executing within the plurality of storage system within dispersed storage environment 100 (e.g., storage systems 120-1, 120-2, 120-3, through 120-n). In some embodiments, if namespace health program 200 determines that information related to a storage system within storage system information 106 is outdated, such as differing from a set of dates or an average information date associated with other storage systems within dispersed storage environment 100 by more than a threshold amount, then namespace health program 200 queries monitoring functions 121 of the storage system associated with the outdated information. In an example, the information related to storage system 120-n differs by more than a week than the information related to storage systems 120-1, 120-2, and 120-3, therefore namespace health program 200 queries monitoring functions 121 of the storage system 120-n to obtain new information related to storage system 120-n.

In step 204, namespace health program 200 determines information corresponding to a storage device of a storage system. Information corresponding to a storage device may include a storage media type, a hardware architecture, a capacity, a date of manufacture, a manufacturer, a cumulative power-on duration, a cumulative number of write operations, and other information previously discussed above. In one embodiment, namespace health program 200 determines information corresponding to a storage device of a storage system based on obtaining information aggregated within storage system information 106. In some embodiments, namespace health program 200 determines information corresponding to a storage device of a storage system from the information received from the broadcast requests for information from the instances of monitoring functions 121 executing within storage system 120-1 through storage system 120-n included within dispersed storage environment 100.

In other embodiments, namespace health program 200 determines additional information related to a storage device or a group of similar storage devices from a network-accessible resource (not shown). The additional information related to the storage device may include analyses associated with storage device failures, manufacturer and lot-based storage device failure rates, environmental factors that affect storage device failures, algorithms utilized to predict storage device failures, information determined from SMART reports, etc.

In step 206, namespace health program 200 identifies a set of storage devices associated with a namespace. In one embodiment, namespace health program 200 identifies a set of storage devices associated with a namespace of a user. In another embodiment, namespace health program 200 identifies a set of storage devices associated with a namespace related to an instance of storage system 120. In one scenario, namespace health program 200 utilizes unified resource names (URNs) related to a namespace to subsequently identify (e.g., map or list) a set of storage devices associated with the namespace. In another scenario, namespace health program 200 identifies a set of storage devices associated with a namespace utilizing a management function to identify volumes associated with a namespace and subsequently identifying one or more storage devices that include a respective volume. For example, namespace health program 200 determines that device L of storage 125-1, device J of storage 125-2, device K of storage 125-3, and device D of storage 125-n (crosshatch shading) are associated with NS 130.

In step 208, namespace health program 200 determines a state of health associated with a namespace. A state of health associated with a namespace may be described with respect to a binary response and a date, a risk factor that increases with time, etc. For example, replace device F through device J of storage system 120-3 by calendar date xyz. A state of health of a namespace may be further determined with respect to a specific instance of storage system 120-1 through storage system 120-n, an indication of criticality of one or more groups of data, etc. A state of health of a namespace may also be described with respect to: one or more trigger or threshold values; relative to one or more impacts to a user, such as a degradation of performance or a latency increase (e.g., adverse effects, negative impacts); etc. For example, an SLA of a user may dictate that the duration for rebuilding corrupted data and/or reconstituting lost data slices cannot exceed 2 hours.

In an embodiment, namespace health program 200 determines a state of health associated with a namespace with respect to one or more of storage system 120-1 through storage system 120-n that include a set of storage devices that are predicted to fail based on various criteria, such as storage device age, analyses of other information corresponding to a storage device, analyses of SMART reports, etc. For example, namespace health program 200 utilizes resources (not shown) external to dispersed storage environment 100 to predict future failure dates for a plurality of storage devices. In some embodiment, namespace health program 200 modifies (e.g., biases) a state of health determination for a namespace based on additions factors or criteria, such as an SLA of a user, implemented data integrity safeguards, such as 3X replication, an IDA utilizing an erasure coding ratio 20/32, etc.

Still referring to step 208, in other embodiments, responsive to determining that the health of a first namespace indicates that a portion of the first namespace requires rebuilding (described in further detail with respect to step 208), namespace health program 200 further determines whether at least a second namespace utilizes one or more of storage system 120-1 through storage system 120-n in common with the first namespace. If namespace health program 200 further determines that at least a second namespace utilizes one or more of storage system 120-1 through storage system 120-n in common with a first namespace, then another instance of namespace health program 200 is executed to determine a state of health associated with each namespaces that utilizes the one or more of storage system 120-1 through storage system 120-n in common with the first namespace.

Figure 3:
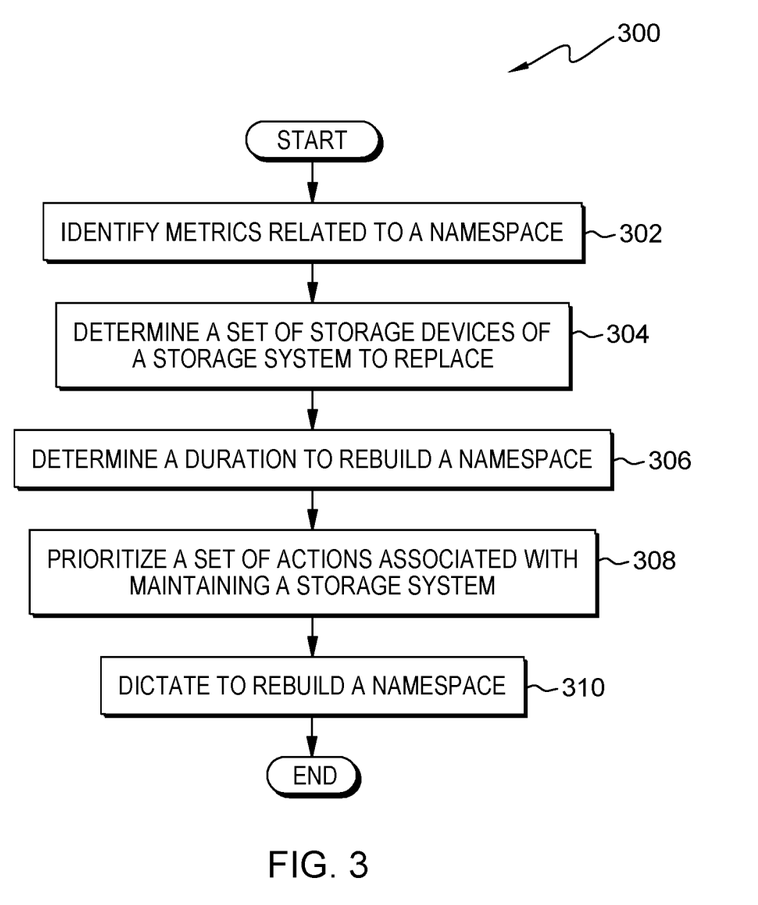
FIG. 3 depicts a flowchart of steps of namespace rebuild program, in accordance with an embodiment of the present invention.

FIG. 3 is a flowchart depicting operational steps for namespace rebuild program 300, a program that determines to rebuild one or more of storage system 120-1 through storage system 120-n within a dispersed storage environment based on metrics related to the namespace, in accordance with embodiments of the present invention. In an embodiment, namespace rebuild program 300 executes in response to one or more determinations by namespace health program 200 and/or events associated with dispersed storage environment 100. In some embodiments, namespace rebuild program 300 creates a plan to rebuild a plurality of storage systems that include data from among two or more user namespaces stored among sets of storage devices identified for replacement.

In step 302, namespace rebuild program 300 identifies metrics related to a namespace. In one embodiment, metrics related to may include a state of health for a namespace; an SLA associated with a namespace; information related to various objects, files, and/or data included within the namespace, such as number of stripe replicas, duplicate data slices, erasure coding ratios, data protection/integrity dictates (e.g., compliance requirements); etc. In various embodiments, namespace rebuild program 300 identifies additional metrics based on information determined by namespace health program 200.

In some embodiments, namespace rebuild program 300 identifies metrics related to a namespace of a user. In other embodiments, namespace rebuild program 300 identifies metrics related to a namespace related to a storage system. In a further embodiment, identifies metrics related to respective namespaces of two or more users.

In step 304, namespace rebuild program 300 determines a set of storage devices of a storage system to replace. In one embodiment, namespace rebuild program 300 determines a set of storage devices of a storage system to replace based on an age and predicted failure date (e.g., a threshold value, a trigger value) corresponding to a set storage devices one or more of storage system 120-1 through storage system 120-n. In another embodiment, namespace rebuild program 300 determines to replace all storage devices within the storage system that are of the same age or similar ages, capabilities, and/or characteristics based on time.

In some embodiments, namespace rebuild program 300 determines a set of storage devices included within a storage system to replace based on various criteria and other factors. The various criteria and other factors utilized by namespace rebuild program 300 may include drive age, namespace health information, SLAs, cumulative power-on duration, one or more error rates, SMART reports, and other information and factors previously discussed with respect to FIG. 2. In an example, namespace rebuild program 300 may utilize various algorithms and/or access resources (not shown) external to dispersed storage environment 100 to determine the set of storage devices within storage system 120-3 to replace.

Still referring to 304, in other embodiments namespace rebuild program 300 determines to replace one or more additional storage devices of a storage system based on other factors. In one example, namespace rebuild program 300 determines to pre-emptively replace one or more additional storage devices within a portion of a storage system to be rebuilt, to minimize downtime related to the storage system. In another example, namespace rebuild program 300 determines to pre-emptively to replace one or more additional storage devices included within a storage system based on a prediction of failure for the one or more additional storage devices, such as determining that the cumulative write activity of an SSD is within a threshold level of the write endurance rating of the SSD, or a state of health corresponding to one or more other namespaces, a quarantined storage device, etc.

In step 306, namespace rebuild program 300 determines a duration to rebuild a namespace. Namespace rebuild program 300 may utilize historic maintenance activity information to determine or estimate a duration to rebuild a namespace. In one embodiment, namespace rebuild program 300 determines a duration to rebuild a namespace of a user. In one scenario, namespace rebuild program 300 may estimate a cumulative duration to rebuild a two or more of storage system 120-1 through storage system 120-n associated with a namespace, and/or a rebuild duration respectively associated with each of storage system of 120-1 through storage system 120-n that includes storage devices identified for replacement. In another scenario, namespace rebuild program 300 estimates a duration to rebuild one or more of storage system 120-1 through storage system 120-n based on replacing all instances of a storage device of the same capabilities and within a range of ages. For example, namespace rebuild program 300 determines to replace all 500 GB, 10K rpm HDDs with power-on ages greater than 48 months across a given namespace.

In another embodiment, namespace rebuild program 300 estimates a duration to rebuild a namespace corresponding to a storage system (e.g., one of storage system 120-1 through storage system 120-n). In some embodiments, namespace rebuild program 300 includes other factors to estimate a duration to rebuild a namespace, such as a duration associated with obtaining each type/capability of storage device to replace; data migration, data restoration, reconstruction related to the plurality of data stored among the storage devices to replace; etc.

In step 308, namespace rebuild program 300 prioritizes a set of actions associated with maintaining a storage system. A set of actions (e.g., a plan) associated with maintaining a storage system may include quarantining a failing storage device, migrating data off of a failing storage device, monitoring the health of one or more namespaces utilizing the storage system, replacing one or more sets of storage devices to rebuild one or more namespaces, etc. Other factors that can affect prioritizing actions associated with maintaining a storage system may include the number of storage devices that are available for rebuilding one or more storage systems at each physical location of dispersed storage environment 100.

In one embodiment, namespace rebuild program 300 prioritizes a set of actions associated with maintaining a storage system (e.g., replacing one or more sets of storage devices) based on the estimated durations respectively associated with the plurality of storage systems. For example, namespace rebuild program 300 may plan to prioritize rebuilding storage system 120-3 because storage system 120-3 includes three namespaces and a higher number of storage devices (i.e., four storage devices) that store data. Therefore, storage system 120-3 has a longer total estimated rebuild duration with respect to including time for data migration and data restoration. In another embodiment, namespace rebuild program 300 prioritizes utilizing dynamic resource procurement and migrating data within a storage system to activated storage devices, and subsequently deactivating the group of storage devices identified for replacement.

Still referring to step 308, in some embodiments, namespace rebuild program 300 prioritizes a set of actions (e.g., creates a plan) associated with rebuilding one or more namespaces related to a storage system based on historical information within namespace health information 107 related to durations related to prior rebuild activities respectively associated with a plurality of namespaces and/or storage systems. In other embodiments, namespace rebuild program 300 prioritizes a set of actions associated a storage system based on information associated with a global namespace corresponding to a storage system.

In step 310, namespace rebuild program 300 dictates to rebuild a namespace. In one embodiment, namespace rebuild program 300 communicates actions and dictates to a system management function (not shown) included in a storage system that is associated with a namespace rebuild. In an example, if namespace rebuild program 300 determines that storage system **120-*n* requires the replacement of all storage devises within storage 125-*n*; then namespace rebuild program 300 can migrate the data within device D and device F of storage 125-*n* to other storage system. Continuing the example, if storage system 120-2 was recently rebuilt, then namespace rebuild program 300 may dictate to automatically migrate data from storage system 120-*n* to storage devices of storage system 120-2**, such as device E and device H.

In some embodiments, namespace rebuild program 300 also communicates actions and dictates to respective administrative consoles (not shown) of dispersed storage environment 100 within each physical location that include one or more of storage system 120-1 through storage system **120-*n* that are associated with a namespace rebuild. Various actions communicated by namespace rebuild program 300 to an administrative console may be manually acted upon by personnel at a physical location that includes the one or more of storage system 120-1 through storage system 120-*n*** identified for rebuild.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
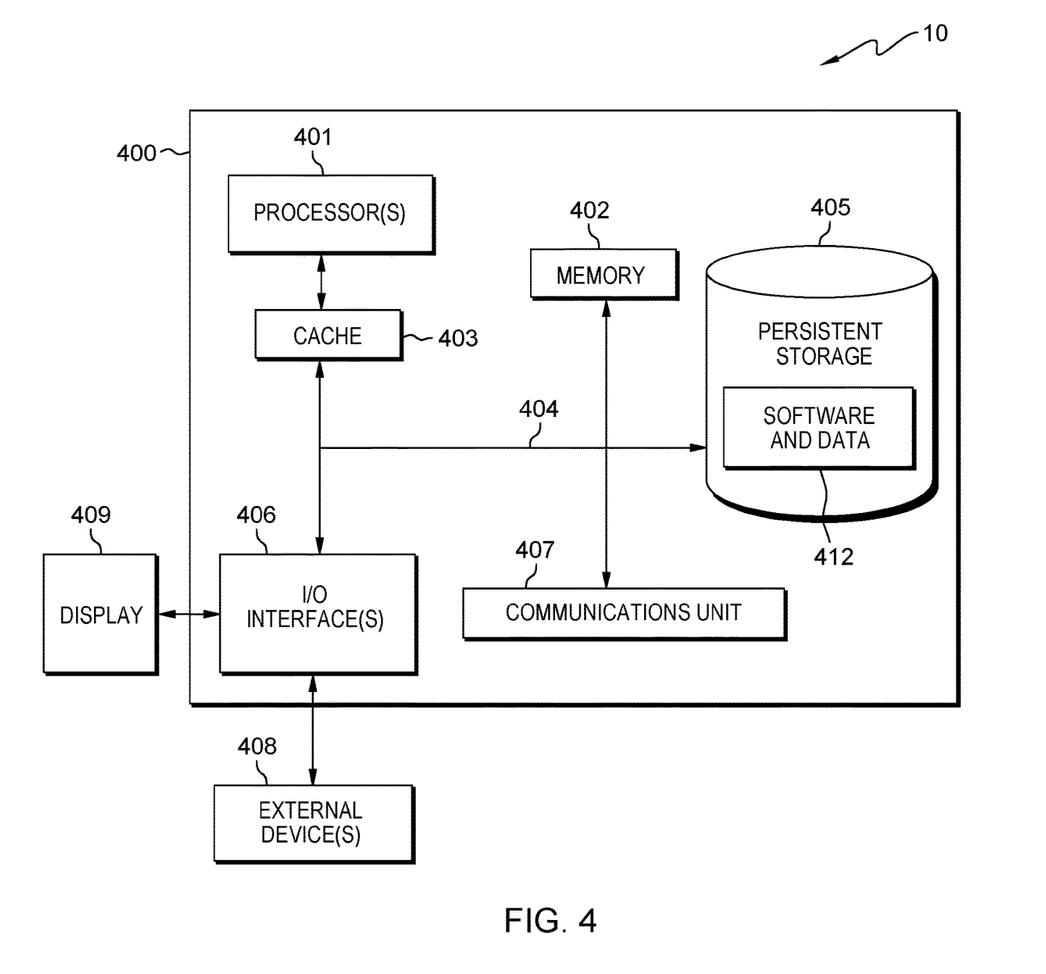
FIG. 4 is a block diagram of components of a computer, in accordance with an embodiment of the present invention.

In an embodiment, FIG. 4 is representative of various computing devices associated with cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality of embodiments of the invention described herein.

Regardless, cloud computing node 10 is capable of being implemented and/or performing any of the functionality set forth hereinabove. In example embodiments, cloud computing node 10 is representative of system 102. In various embodiments, cloud computing node 10 may be representative of hardware physical instances of hardware elements and/or computing devices (e.g., RISC based servers 62, servers 63, etc.) and/or virtualized instance of hardware elements, computing devices (e.g., virtual servers 71, virtual storage 72, virtual networks 73, etc.) discussed further with respect to FIG. 6.

As shown in FIG. 4, in some embodiments computer system 400 in cloud computing node 10 is shown in the form of a general-purpose computing device. In other embodiments, computer system 400 is representative of one or more computing devices connected to cloud computing environment 50, such as system 102, and storage system 120-1 through storage system 120-n. Computer system 400 is an example of a system that includes software and data 412. Computer system 400 includes processor(s) 401, memory 402, cache 403, persistent storage 405, communications unit 407, input/output (I/O) interface(s) 406, and communications fabric 404.

Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random-access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 are stored in persistent storage 405 for access and/or execution by one or more of the respective processor(s) 401 via cache 403 and one or more memories of memory 402. With respect to system 102, software and data 412 includes storage system information 106, namespace health information 107, namespace health program 200 and namespace rebuild program 300 and other programs and data (not shown).

Communications unit 407, in these examples, provides for communications with other data processing systems or devices, including resources of system 102 and storage systems 120-1, 120-2, 120-3, through 120-n. In these examples, communications unit 407 includes one or more network interface cards. Communications unit 407 may provide communications, through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor. Display 409 can also function as a touch screen, such as the display of a tablet computer or a smartphone.

Figure 5:
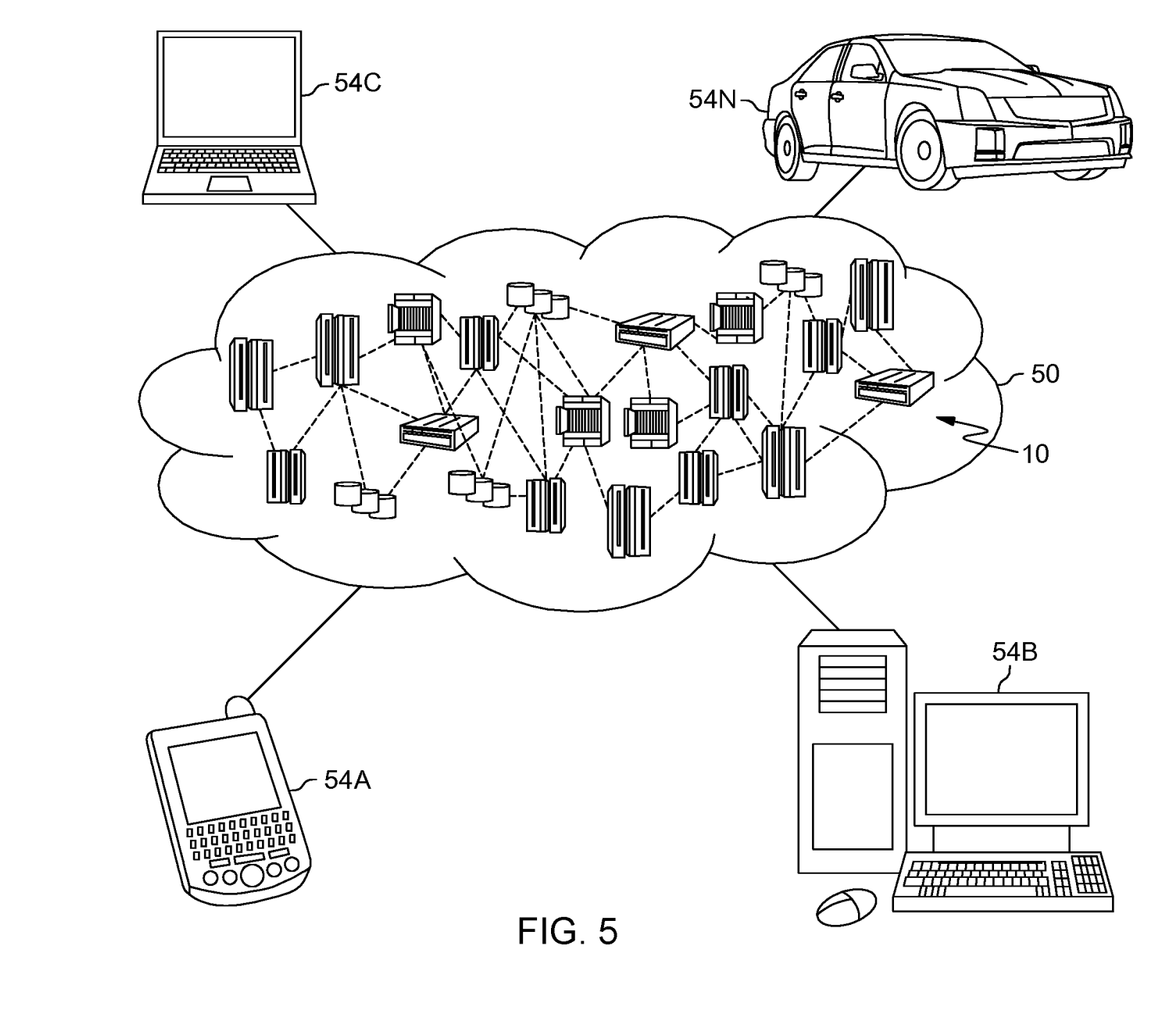
FIG. 5 depicts a cloud computing environment, according to an embodiment of the present invention.

FIG. 5 depicts an illustrative example of cloud computing environment 50. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Instances of node 10 may communicate with one another. Instances of node 10 may be grouped (not shown) physically or virtually, in one or more networks, such as Private, Community, Public, or Hybrid clouds as described herein, or a combination thereof. This allows cloud computing environment 50 to offer infrastructure, platforms and/or software as services for which a cloud consumer does not need to maintain resources on a local computing device.

It is understood that the types of computing devices 54A-N shown in FIG. 5 are intended to be illustrative only and that instances of computing node 10 and cloud computing environment 50 can communicate with any type of computerized device over any type of network and/or network addressable connection (e.g., using a web browser). In addition, instances of cloud computing node 10 and computing devices 54A-N may include components, previously depicted and described in further detail with respect to FIG. 4, in accordance with embodiments of the present invention.

Figure 6:
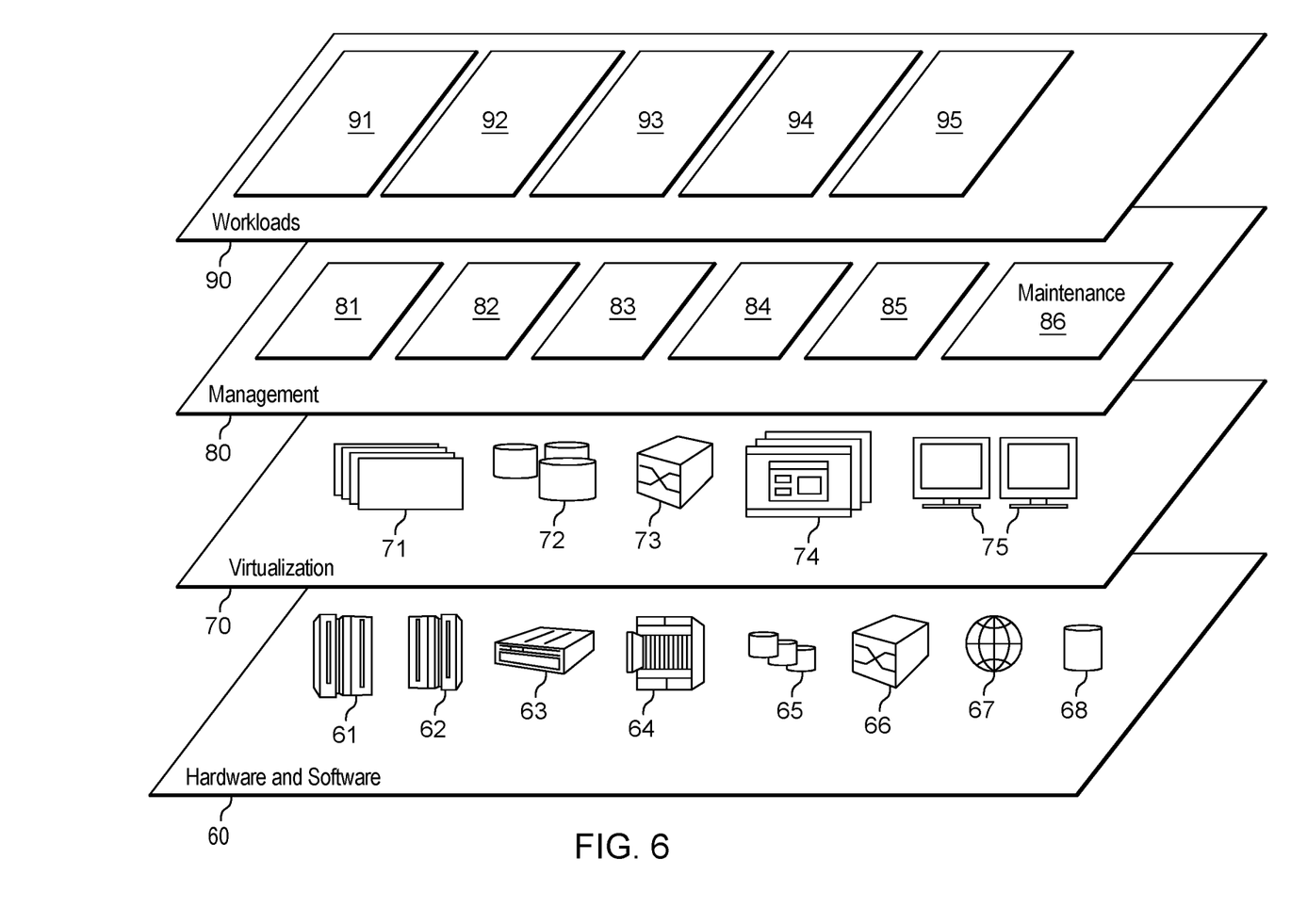
FIG. 6 depicts a set of functional abstraction layers of a cloud computing environment, according to an embodiment of the present invention.

FIG. 6 depicts illustrative a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Maintenance 86 provides support to rebuild one or more namespaces of storage systems within hardware and software layer 60. In an embodiment, maintenance 86 includes at least namespace health program 200 and namespace rebuild program 300. In some embodiments, maintenance 86 utilizes other aspects of management layer 80 to monitor and control resources within hardware and software layer 60.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    identifying, by one or more computer processors, a set of storage devices associated with a namespace of a user;
    determining, by one or more computer processors, a state of health of the namespace based on information related to the set of storage devices associated with the namespace, wherein the set of storage devices are predicted to fail based on (i) device age, (ii) analyses of information corresponding to a storage device and (iii) analyses of a self-monitoring, analysis, and reporting technology report;
    identifying, by one or more computer processors, a set of criteria related to the state of health of the namespace, the set of criteria including drive age, namespace health information, cumulative power-on duration and one or more error rates;
    responsive to determining that one or more criteria related to the state of health of namespace attains respective trigger values, replacing, by one or more computer processors, a first set of storage devices that store data corresponding to the namespace and are included among one or more storage systems;
    prioritizing, by one or more computer processors, replacement of a second set of storage devices from among the first set of storage devices associated with the namespace of the user based on one or more factors;
    dictating, by one or more computer processors, to replace the first set of storage devices that store data corresponding to the namespace and are included among the one or more storage systems;
    determining, by one or more computer processors, that a storage system affected by the first set of storage devices to replace includes one or more other storage devices that include a set of characteristics that are within a threshold level of the first set of storage devices to replace; and
    determining, by one or more computer processors, to replace the one or more other storage devices in addition to the first set of storage devices.

2. The method of claim 1, wherein the namespace is associated with a plurality of data and associated with the user.

3. The method of claim 1, wherein the one or more storage systems are interconnected via an Internet-based network and respectively include a plurality of storage devices, and wherein the plurality of storage devices include one or more storage device types selected from the group consisting of solid-state drives, hard disk drives, magnetic tapes, and storage-class memory.

4. The method of claim 1, further comprising:
grouping, by one or more computer processors, a plurality of storage devices of a storage system into one or more groups of storage devices based on an age and respective capabilities corresponding to a storage device; and
determining, by one or more computer processors, to replace all storage devices of a first group of storage devices within the storage system, wherein one or more storage devices of the first group of storage devices are identified as being included within the first set of storage devices.

5. The method of claim 1, wherein the one or more factors include factors are selected from the group consisting of a duration to replace the one or more storage devices within a storage system, a number of namespaces affected by replacing one or more storage devices within the storage system, a duration to migrate data from the one or more storage devices to replace to other storage devices not replaced, and a service-level agreement.

6. A computer program product comprising:
one or more computer readable storage media and program instructions stored on the one or more computer readable storage media, the program instructions readable/executable by one or more computer processors:
program instructions to identify a set of storage devices associated with a namespace of a user;
program instructions to determine a state of health of the namespace based on information related to the set of storage devices associated with the namespace, wherein the set of storage devices are predicted to fail based on (i) device age, (ii) analyses of information corresponding to a storage device and (iii) analyses of a self-monitoring, analysis, and reporting technology report;
program instructions to identify a set of criteria related to the state of health of the namespace, the set of criteria including drive age, namespace health information, cumulative power-on duration and one or more error rates;
responsive to determining that one or more criteria related to the state of health of namespace attains respective trigger values, program instructions to replace a first set of storage devices that store data corresponding to the namespace and are included among one or more storage systems;
program instructions to prioritize replacement of a second set of storage devices from among the first set of storage devices associated with the namespace of the user based on one or more factors;
program instructions to dictate to replace the first set of storage devices that store data corresponding to the namespace and are included among the one or more storage systems;
program instructions to determine whether a storage system affected by the first set of storage devices to replace includes one or more other storage devices that include a set of characteristics that are within a threshold level of the first set of storage devices to replace; and
program instruction to determine to replace the one or more other storage devices in addition to the first set of storage devices.

7. The computer program product of claim 6, wherein the namespace is associated with a plurality of data and associated with the user.

8. The computer program product of claim 6, wherein the one or more storage systems are interconnected via an Internet-based network and respectively include a plurality of storage devices, and wherein the plurality of storage devices include one or more storage device types selected from the group consisting of solid-state drives, hard disk drives, magnetic tapes, and storage-class memory.

9. The computer program product of claim 6, further comprising:
program instructions to group a plurality of storage devices of a storage system into one or more groups of storage devices based on an age and respective capabilities corresponding to a storage device; and
program instructions to determine to replace all storage devices of a first group of storage devices within the storage system, wherein one or more storage devices of the first group of storage devices are identified as being included within the first set of storage devices.

10. The computer program product of claim 1, wherein the one or more factors include factors selected from the group consisting of a duration to replace one or more storage devices within a storage system, a number of namespaces affected by replacing the one or more storage devices within the storage system, a duration to migrate data from the one or more storage devices to replace to other storage devices not replaced, and a service-level agreement.

11. A computer system comprising:
one or more computer processors;
one or more computer readable storage media; and
program instructions stored on the computer readable storage media for execution by at least one of the one or more computer processors, the program instructions comprising:
program instructions to identify a set of storage devices associated with a namespace of a user;
program instructions to determine a state of health of the namespace based on information related to the set of storage devices associated with the namespace, wherein the set of storage devices are predicted to fail based on (i) device age, (ii) analyses of information corresponding to a storage device and (iii) analyses of a self-monitoring, analysis, and reporting technology report;
program instructions to identify a set of criteria related to the state of health of the namespace, the set of criteria including drive age, namespace health information, cumulative power-on duration and one or more error rates;
responsive to determining that one or more criteria related to the state of health of namespace attains respective trigger values, program instructions to replace a first set of storage devices that store data corresponding to the namespace and are included among one or more storage systems;
program instructions to prioritize replacement of a second set of storage devices from among the first set of storage devices associated with the namespace of the user based on one or more factors;
program instructions to dictate to replace the first set of storage devices that store data corresponding to the namespace and are included among the one or more storage systems;
program instructions to determine whether a storage system affected by the first set of storage devices to replace includes one or more other storage devices that include a set of characteristics that are within a threshold level of the first set of storage devices to replace; and program instruction to determine to replace the one or more other storage devices in addition to the first set of storage devices.

12. The computer system of claim 11, wherein the namespace is associated with a plurality of data and associated with the user.

13. The computer system of claim 11, wherein the one or more storage systems are interconnected via an Internet-based network and respectively include a plurality of storage devices, and wherein the plurality of storage devices include one or more storage device types selected from the group consisting of solid-state drives, hard disk drives, magnetic tapes, and storage-class memory.

14. The computer system of claim 11, further comprising:

program instructions to group a plurality of storage devices of a storage system into one or more groups of storage devices based on an age and respective capabilities corresponding to a storage device; and program instructions to determine to replace all storage devices of a first group of storage devices within the storage system, wherein one or more storage devices of the first group of storage devices are identified as being included within the first set of storage devices.

* * * * *